R. M. INGLIS & F. E. WOOD.
BUNDLE BINDING MACHINE.
APPLICATION FILED SEPT. 10, 1909.
1,058,751.
Patented Apr. 15, 1913.
7 SHEETS—SHEET 5.
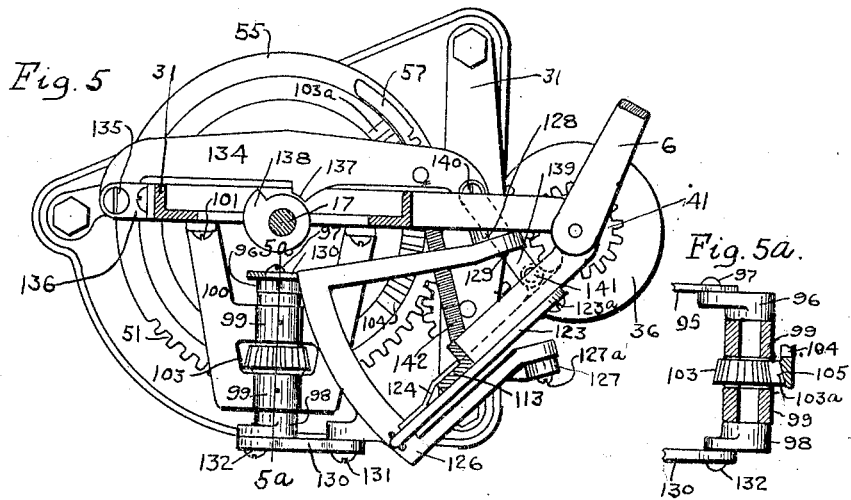
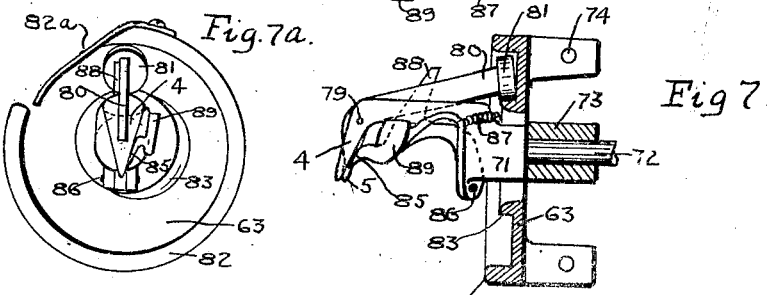
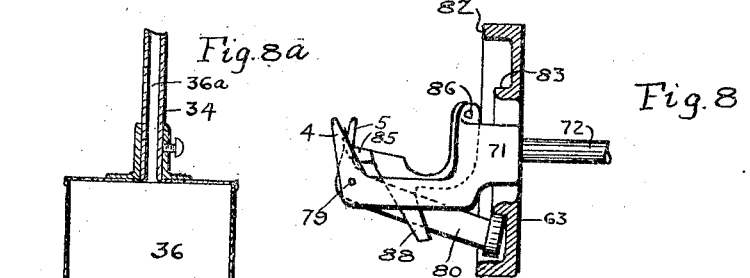
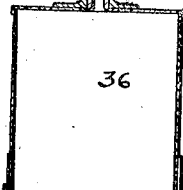
Witnesses
Margaret Beigle
Vinnie C. Hess
Inventors
Richard M. Inglis
and
Frank E. Wood
Attorney R. M. INGLIS & F. E. WOOD.
BUNDLE BINDING MACHINE.
APPLICATION FILED SEPT. 10, 1909.
1,058,751.
Patented Apr. 15, 1913.
7 SHEETS—SHEET 6.
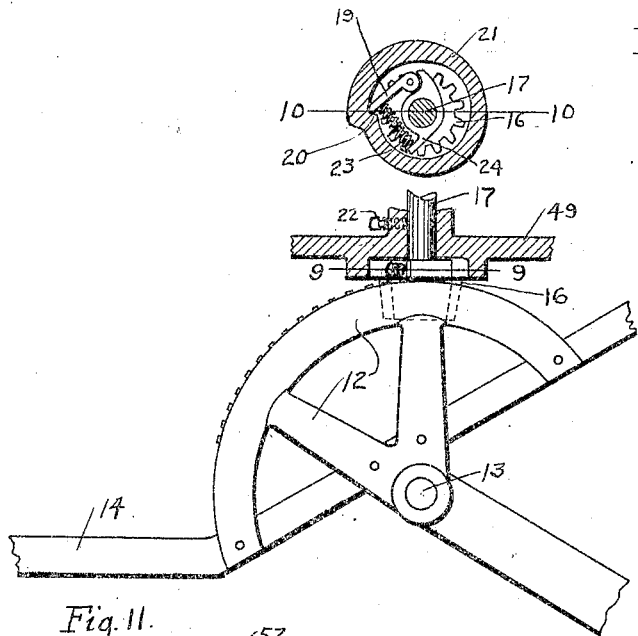
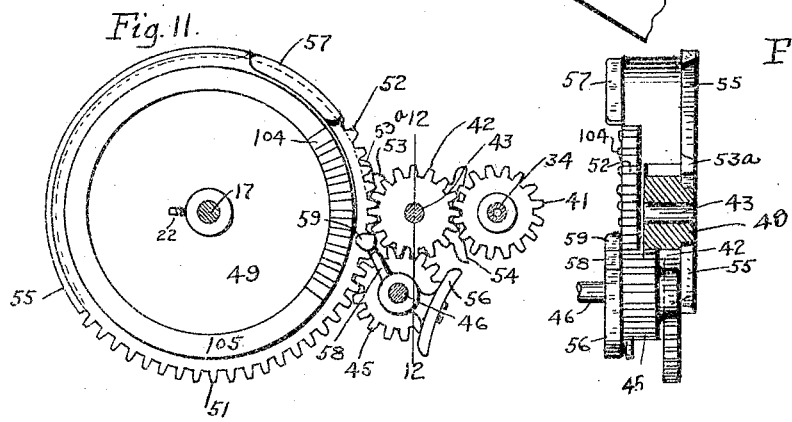
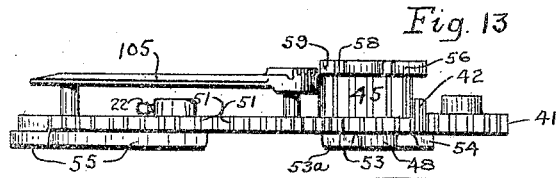
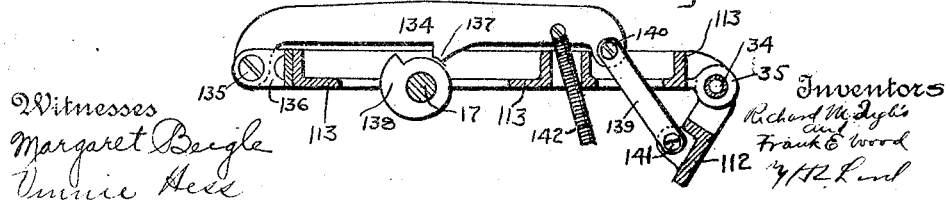
Witnesses
Margaret Beigle
Vinnie Hess
Inventors
Richard M. Inglis
Frank E. Wood
Attorney

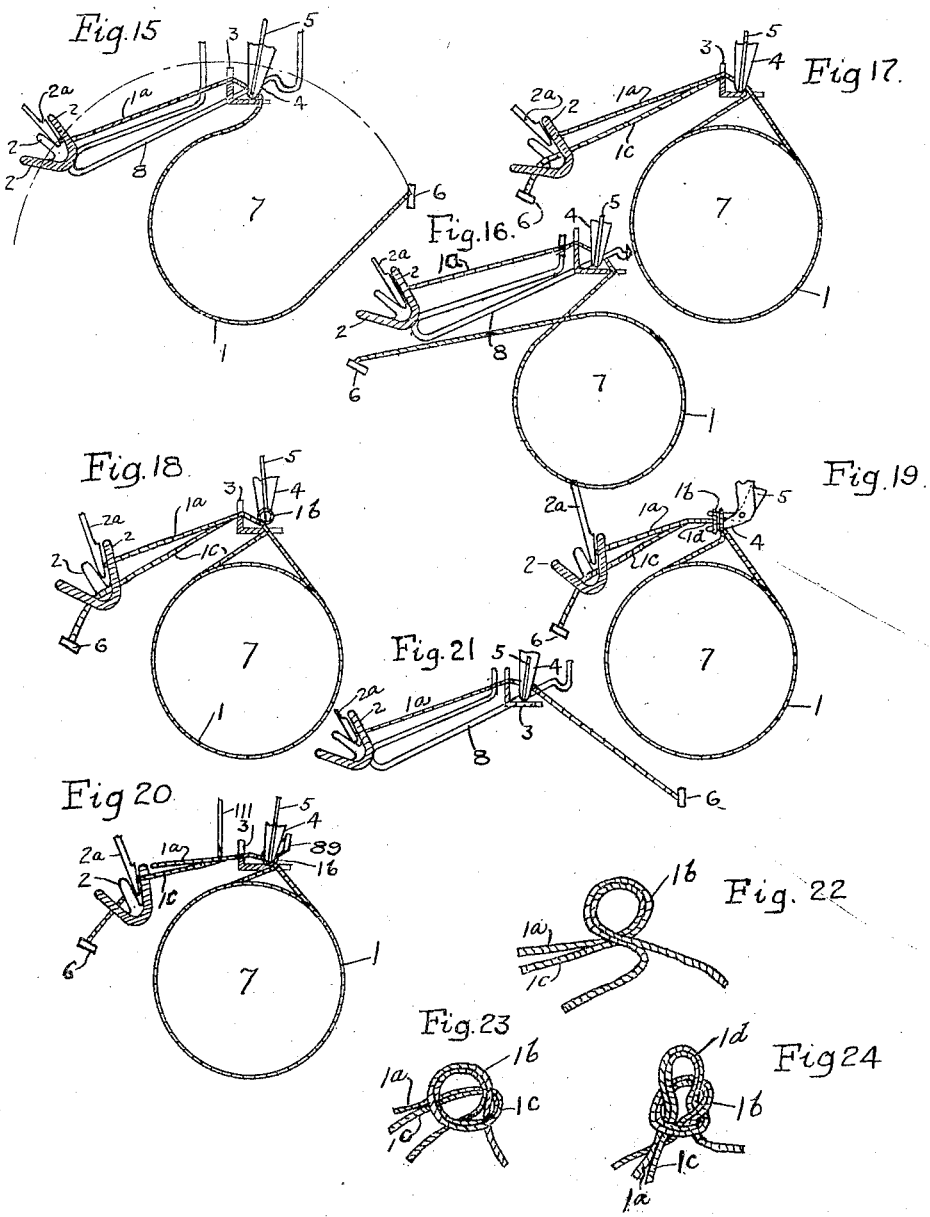

UNITED STATES PATENT OFFICE.

RICHARD M. INGLIS, OF YOUNGSTOWN, OHIO, AND FRANK E. WOOD, OF GIRARD, PENNSYLVANIA; SAID WOOD ASSIGNOR TO SAID INGLIS.

BUNDLE-BINDING MACHINE.

1,058,751.  Specification of Letters Patent.  Patented Apr. 15, 1913.

Application filed September 10, 1909. Serial No. 517,022.

*To all whom it may concern:*

Be it known that we, RICHARD M. INGLIS and FRANK E. WOOD, citizens of the United States, and residing, respectively, at Youngstown, county of Mahoning, and State of Ohio, and Girard, county of Erie, and State of Pennsylvania, have invented new and useful Improvements in Bundle-Binding Machines, of which the following is a specification.

This invention relates to bundle binding machines and consists in certain improvements in the construction thereof as will be hereinafter fully described and pointed out in the claims.

The invention is especially designed for bundling vegetables, such as onions or asparagus, and the machine shown is specifically designed for this purpose, although it should be understood that the invention in its broader aspects is not limited to this specific adaptability.

Figure 1:
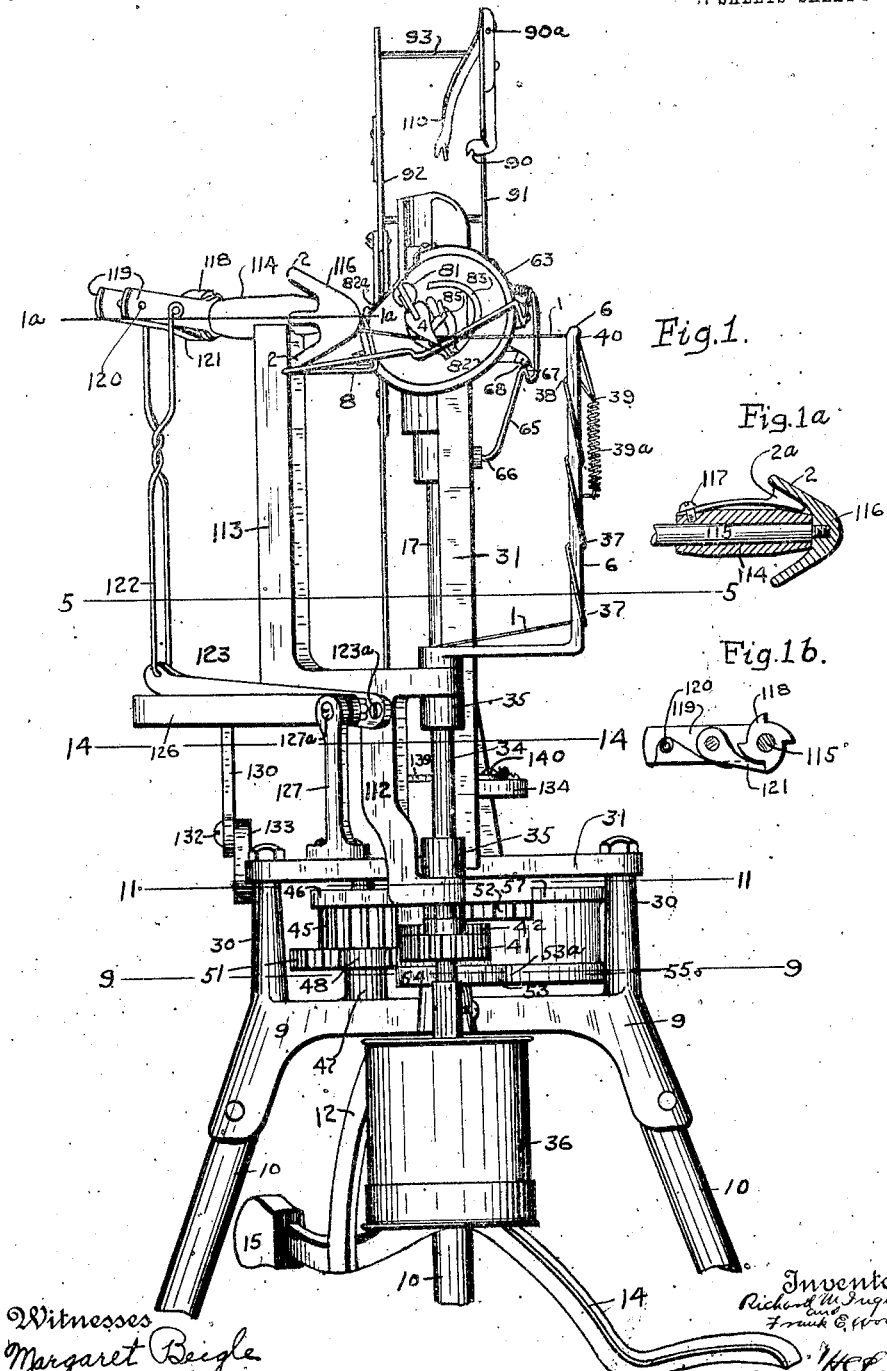
Figure 2:
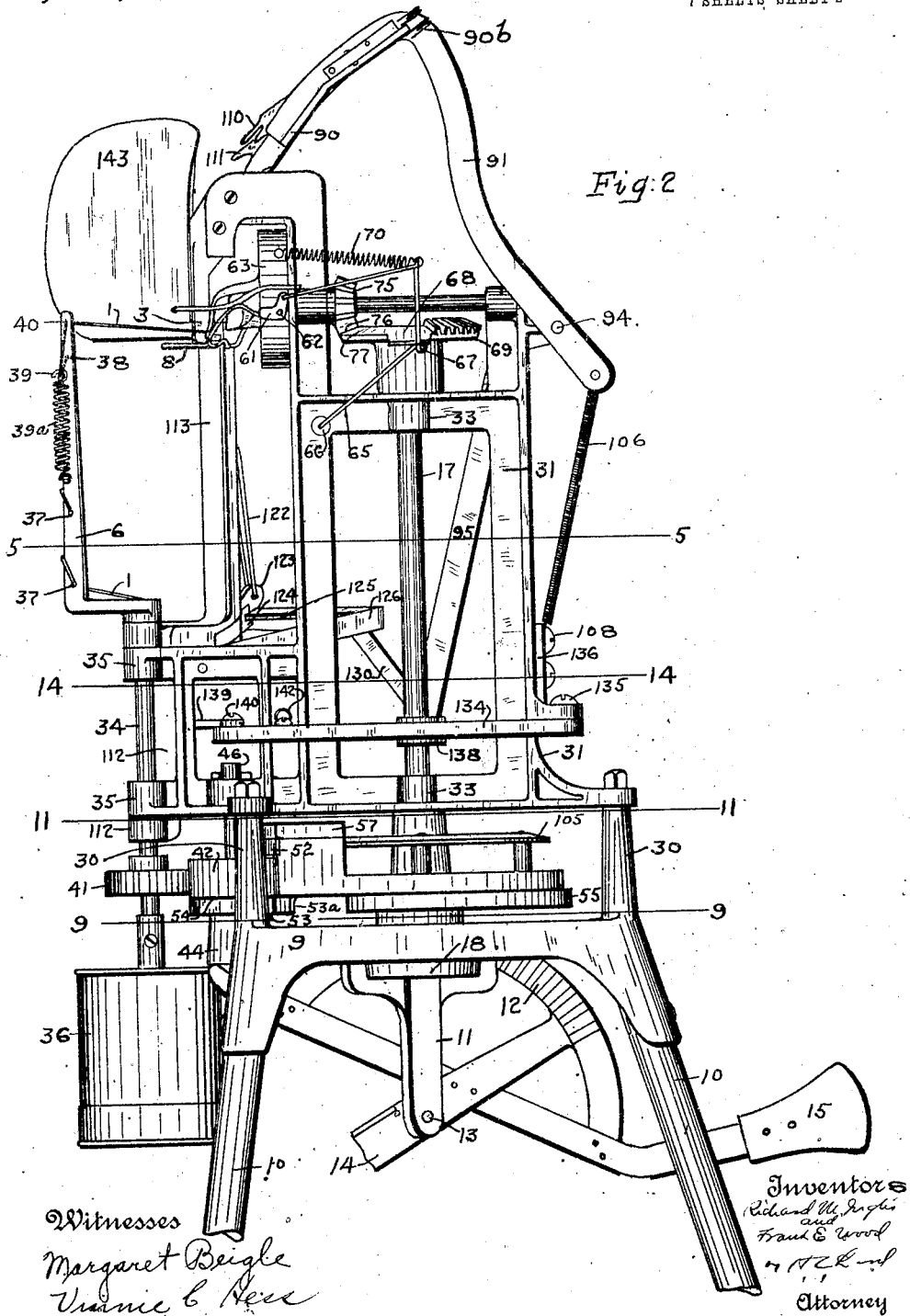
Figure 3:
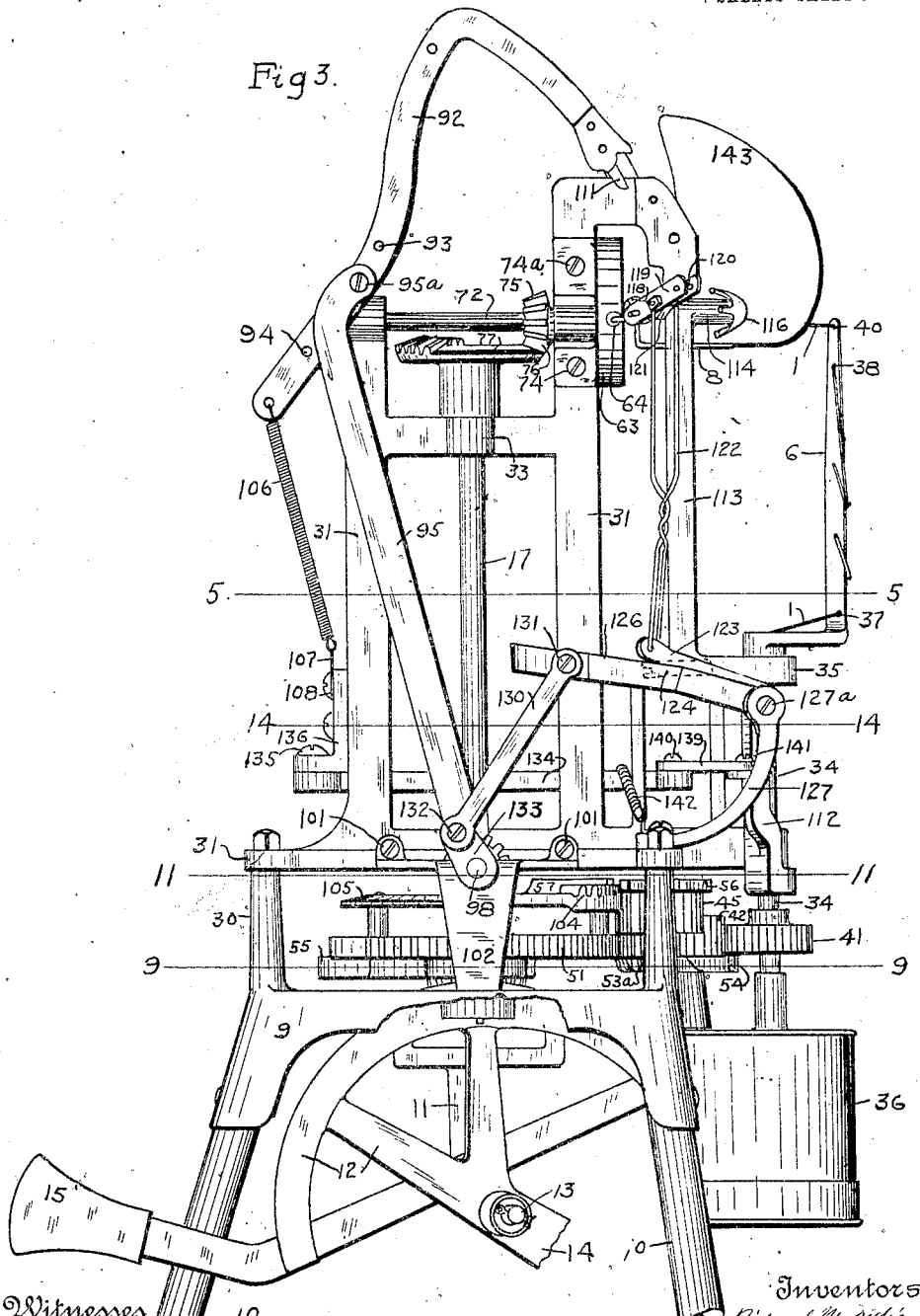
Figure 4:
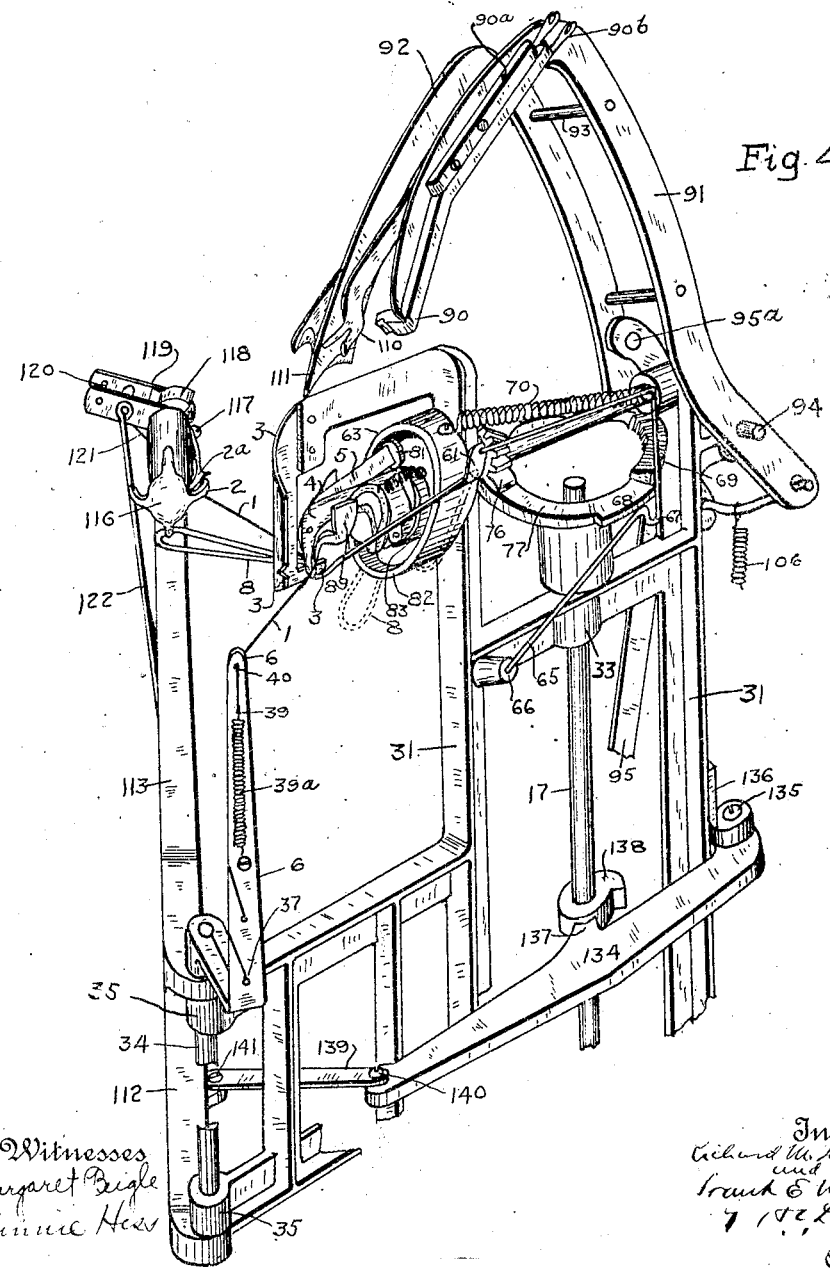

The invention is illustrated in the accompanying drawings as follows:

Figure 1 shows a front elevation of the machine: Fig. 1ª, a section of the twine grip mechanism; Fig. 1ᵇ, a section showing the ratchet mechanism for actuating the twine grip; Fig. 2 is a side elevation from the right of Fig. 1; Fig. 3 is a side elevation from the left of Fig. 1; Fig. 4 is a perspective view of the upper part of the machine; Fig. 5 is a section of the line 5—5 in Fig. 3; Fig. 5ª is a section on the line 5ª—5ª in Fig. 5; Fig. 6 is a plan view of the knot tying fingers; Fig. 7 is a side elevation of the same mechanism including their mounting; Fig. 7ª is an end view of the fingers from the front; Fig. 8 is a side elevation of the fingers, with the fingers in their upper position as they are turned in tying a knot; Fig. 8ª is a section of the cord carrying box and shaft carrying the same and the twine carrier; Fig. 9 is a section of the line 9—9 in Fig. 10, and on the line 9—9 in Fig. 3; Fig. 10 is a detail showing the driving segment and the main shaft; Fig. 11 is a plan view of the gears actuating the twine carrier, and push off and cutter arm; Fig. 12 is a view of the same parts on the line 12—12 in Fig. 11; Fig. 13 is a side view of the parts shown in Fig. 11; Fig. 14 is a section of parts of the machine on the line 14—14 in Fig. 3 showing the mechanism for swinging the twine grips as the knot is formed; Figs. 15, 16, 17, 18, 19, 20 and 21 show the position assumed by the twine, and the parts immediately employed in handling it during the different stages of the operation of the machine; Figs. 22, 23 and 24 show the position of the twine in different stages, forming the knot.

The machine makes two wraps of the twine around the bundle, and then ties the knot, and severs the twine. The material is held in the shape of a bundle, the bundle extending vertically.

Observing Fig. 15 and following: 1 marks the twine. The end of the twine is held between the twine grip finger 2 and the spring finger 2ª, these forming the twine grip. The first reach 1ª of the twine extends over the hook 3, and from this passes around the tying fingers 4 and 5 to the twine carrying arm 6. The twine is forced into position shown in Fig. 21 and in dotted lines in Fig. 15, so as to form a loop. The material in the bundle is arranged in the space 7. With the first movement of the machine, the carrier 6 is carried in the orbit indicated by the dash line, carrying the twine around the bundle, a suitable tension device being provided to give the twine a suitable tension as it is wrapped around the bundle. On the first wrap of the twine, it is prevented from engaging the fingers 4 and 5 or the hook 3 or the bottom finger 2 of the gripper by the bail 8, which deflects the twine below these parts, as shown in Fig. 16. Between the first and second wraps, however, the bail 8 is lowered so that on the second wrap of the twine, the carrier carries the twine over the fingers 4 and 5, over the hook 3 and over the bottom finger of the gripper 2, the parts at the completion of the second wrap being as shown in Fig. 17. With the parts in this position, the tying fingers 4 and 5 are rotated, forming the loop 1ᵇ in the twine. Fig. 18 shows the tying fingers 4 and 5 turned to a vertical position. Fig. 22 shows the loop 1ᵇ with the parts in this position. On assuming this position the tying finger 4 is swung so as to open the fingers, and with the further rotary movement of the fingers, they straddle the reach 1ª, and the reach 1ᶜ of the twine, as is clearly shown in Fig. 19. As they are turned to their original or downward position, the finger 5 is closed so as to firmly grip the reaches 1ª and 1ᶜ. This is the position shown in Fig. 20, and the loop 1ᵇ and reaches 1ᵃ and 1ᶜ are in the position shown in Fig. 23. The twine grip 2 is swung toward the fingers 4 and 5 as they are turned to give them the proper amount of twine for this purpose. When the parts reach the position shown in Fig. 20, the bottom finger of the twine grip 2 is moved a quarter of a revolution, so as to carry the reach 1ᶜ up between the finger 2 and the spring finger 2ᵃ, thus gripping the reach 1ᵃ, and releasing the reach 1ᶜ. At this moment the severing device 111 operates upon the reach 1ᶜ, and severs the twine, and at the same time the push off device 90 operates to push the loop 1ᵇ off the fingers 4 and 5, so that the twine assumes the position shown in Fig. 24. The elasticity of the material being bundled, and of the twine, readily sets the knot as the loop 1ᵈ is pulled through the loop 1ᵇ. Upon the completion of the knot as shown in Fig. 24, the twine carrier 6 is returned to its initial position, the end of the twine being engaged by the twine grip and the twine passes over the hook 3 and between the fingers 4 and 5 as the carrier 6 is returned so that the twine is brought to the position shown in Fig. 21. The bundle just bound is removed, and a fresh bundle is inserted, carrying the twine to the position shown in Fig. 15.

The machine is mounted on the base plate 9 from which extend the legs 10. A bracket 11 extends downwardly from the bottom of base 9. The gear segment 12 is journaled on the pin 13, extending from this bracket. This gear segment is actuated by a foot lever 14, the foot lever being balanced by the weight 15. This gear segment is the driving mechanism for the machine.

The gear segment meshes a gear 16. The gear 16 is journaled on the driving shaft 17. The gear is mounted in a pocket 18 at the top of the bracket 11. A pawl 19 is pivotally mounted on the top of the gear 16, and is adapted to engage the shoulder 20 in a flange 21, extending downwardly from a cam and gear plate 49. This plate is fixed on the shaft 17 by means of the screw 22. A spring 23 is arranged between a finger 24 and the top of the gear 16, and the pawl 19, and tends to force the pawl outwardly so as to bring it into engagement with the shoulder 20. The driving shaft 17 is driven by this mechanism, one complete rotation with each operation of the gear segment 12, and the ratchet mechanism arranged on the gear just described permits of the return of the segment after each operation and while the driving shaft is rotated one revolution with each operation, it is always in the same direction. The base is provided with the upwardly extending posts 30, and the frame 31 of the machine is mounted on these posts. The bottom of the driving shaft is stepped in the pocket 18 on the bracket 11 (this bearing not being shown) and is also journaled in the bearings 33—33 in the frame 31.

The twine carrier 6 is in the form of an off-set arm mounted on the shaft 34. The shaft 34 is journaled in the bearings 35—35 arranged in the frame 31. The twine is placed in a box 36 and led through the opening 36ᵃ in the shaft 34, this opening extending entirely through the shaft from top to bottom. The twine is then led through the openings 37—38 in the carrier 6, then through a hook 39, in a spring 39ᵃ, and through an opening 40 at the top of the carrier. This path of the twine gives it the proper tension and the spring 39ᵃ allows for unusual movements due to uneven bundles so that the pull may be uniform.

It will be remembered that the carrier finger starting from the position shown in Figs. 15-21 makes two wraps of the twine, and is carried to the position shown in Fig. 17 at the end of the second wrap. It pauses during the tying and severing operation, and is then returned by a backward movement carrying the twine over the hook 3 and behind the fingers 4 and 5 to the position shown in Fig. 21. The mechanism for accomplishing this movement is shown in Figs. 11, 12 and 13. A gear 41 is fixed on the shaft 34. This gear meshes a gear 42. The gear 42 is journaled on the shaft 43 which extends upwardly from the lug or projection 44 on the base 9. The gear 42 meshes a gear 45. The gear 45 is journaled on a stud 46 extending upwardly from the lug or projection 47 on the base 9. While the gears 42 and 45 mesh, it will be noted in Fig. 12 that the gear 42 extends below the gear 45. The hub 48 of the gear 42 holds it above the projection 47 sufficiently for this purpose. The gears for operating the gears 42 and 45 are carried by a plate 49 fixed on the driving shaft. The gear 42 acts as intermediate gear which drives the shaft 34 forward and the gear 45, acting through the gear 42, reverses the motion. The gear 42 is driven by the gear 51 on the plate 49. This is what is known as a mutilated gear, the extent of the gear segment being clearly shown in Fig. 13, and is sufficient to give the gear 42 and the gear 41 the necessary rotation to move the carrier 6 from the position shown in Fig. 15 to the position shown in Fig. 17, forming the two complete wraps. The gear 45 is actuated by the gear 52 which is arranged at the top of the plate 49 above the gear 51, and its extent is clearly shown in Fig. 11. It will be noted that the gear 52 is entirely above the gear 42 so that it entirely clears it. On the other hand, the gear 45 is above the gear 51 so as to clear it. The extent of the gear 52 is such as to rotate the gear 45 and with it the gears 42 and 41 in reverse direction, so as to move the carrier 6 from the position shown in Fig. 17, to the position shown in Fig. 21, and there must be sufficient dwell between the action of the gear 51 and gear 52 to permit of the tying and severing operations. When the gear 42 reaches the end of the gear 51, a lock finger 54 passes on to the dwell surface 55 and this locks the different gears in position throughout the length of the dwell surface 55. The extent of this surface is clearly shown in Figs. 11 and 13. Before the lock finger 54 passes off the dwell surface 55, a lock finger 56 on the gear 45 passes onto the dwell surface 57. As the lock finger 56 is brought off the dwell surface 57, the gear 45 is moved into mesh with the gear 52, thus reversing the carrier 6 through this action. This is accomplished by utilizing the gear 42 as an intermediate gear. As the gear 45 passes off the gear 52, the lock finger 53 is brought onto the dwell surface 53ª so that the gears are momentarily locked in this position. It will be noted that when the parts have reached this position, the carrier 6 is in its initial position and the driving segment 12 has reached the limit of its movement. With the next forward movement of the plate 49 the finger 58 is engaged by the projection 59. This finger acting with the locking finger 53, prevents the movement of the carrier 6 between the operations of the machine, so as to throw the gears out of mesh. With the initial movement of the plate 49, the finger 58 comes into contact with the projection 59 so as to assure the proper starting of the gear 42 in the gear 51.

The bail 8 is secured at one end to a bell crank lever 61, this lever being journaled on a pin 62 extending from the cam plate 63 to the opposite end of the bail extends into this cam plate at 64,—the end of the bail extending in at 64 having the same axis as the pin 62. A lever 65 formed of wire has its end 66 extending into the frame 31, thus forming a pivotal support for the lever. The lever has a turn 67, the turn 67 extending under a cam plate 68 on the gear 69, the gear 69 being fixed on the driving shaft 17. The upper end of this lever is connected with the upper arm of the bell crank 61. The spring 10 extends from the cam plate 63, to this lever, and tends to force the lever toward the front of the machine, so as to throw the bail 8 down. The cam 68 on the other hand throws the lever to the rear of the machine, and the lever acting through the bell crank, raises the bail to the position shown in Fig. 1, and in position to prevent the engagement of the twine with the tying fingers, the hook 3 and the grip finger 2. The spring 70 extends from the cam plate bail 8 in its upper position during the first turn of the carrier 6. Immediately after the carrier has passed the grip finger 2, the turn 67 passes from under the cam 68, and the bail 8 drops so that on the second pass of the twine, it engages the tying fingers the hook 3, and the grip finger 2. The gear 69, of course, makes one revolution with each operation of the machine so that the single cam is timed to operate as described.

The tying fingers 4 and 5 are carried by a head 71. This head is carried by the shaft 72 which is journaled in a bearing 73. The bearing 73 is arranged in the frame 31. The cam plate 63 has the perforated lugs 74, and is secured to the frame by means of the screws 74ª, extending through these lugs. A mutilated gear 75 is fixed on the shaft 72. It has a dwell surface 76 which operates on a similar surface 77 on the gear 69. The dwell surface 77 is of sufficient extent to give the necessary pause to the tying fingers and the gear 69 is of sufficient length relatively to the gear 75 to give the gear 75 one complete revolution with each rotation of the shaft 17, and the location or timing of this gear is clearly shown in Fig. 15 and following,—that is, the gear 69 is brought into action as the twine is brought to the position shown in Fig. 17, and is given the single rotation necessary to form the knot.

The movable finger 5 extends through a slot in the fixed finger 4, and is journaled on the pin 79. The movable finger is provided with an extension 80 on the end of which is a roll 81. This roll operates on the cam ways 82 and 83, the cam way 83 tending to move the finger 5 so as to open the fingers, and the cam way 82 operating to close them. The shape of this cam is clearly shown in Figs. 1 and 7ª, and is so timed as to open the finger prior to the time the fingers are brought over the reaches 1ª and 1ᶜ, and to close the fingers on the loop 1ᵈ at the completion of the revolution of the fingers. The normal position of the fingers, therefore,— or in other words, the position of the fingers during the dwell,—is closed. The spring 82ª on the cam 82 gives a spring pressure to the fingers, maintaining them in a closed position.

A push off finger 85 is pivoted at 86 on the head 71. It is mounted on a pivot by a pin 86 extending to the head. One branch 88 of the push off finger extends up through the same slot with the finger 5, and a projection 89 of this push off finger extends up outside of the finger 4, and to the right of finger 4 as shown in Figs. 1 and 4, in position to be engaged by the push off finger 90 on the push off arm 91. The push off arm 91 is connected with the severing arm 92 by the cross bolts 93. This double arm is carried by a pin 94 arranged on a bracket secured to frame 31. A link 95 is pivotally secured to the arm by the screw 95ª. This link is secured to a crank 96 by a screw 97. The crank 96 is fixed on the shaft 98 and this shaft is journaled in bearings 99 on the bracket 100. The bracket 100 is secured to the frame 31 by screws 101. The bracket has the projection 102 which rests on the base 9. A gear 103 is fixed on the shaft 98 and is driven by a gear 104 mounted on the plate 49. This gear 104 has a dwell surface 105 on which the dwell surface 103ª on the gear 103 operates. This dwell surface is sufficient to give the pause in the arms 91 and 92 and the gear 104 is sufficient to make one complete revolution of gear 103 with each cycle of the machine, and is timed to operate so as to sever the twine when the parts reach the position shown in Fig. 20, and also to push off the knot with the same operation. In order to relieve the dwell surface, the arms 91 and 92 are maintained in this upper position by the spring 106 which extends from the end of the arms to a plate 107, this plate being secured to the frame by the screw 108. In order to supplement the action of the push off finger 85, I prefer to form a finger 110 on the arm 91 in position to wipe the finger 4 to assure the pushing off of the knot. It will be noted that the finger 85 is at a slight slant to the movement of the arm 91 as it is moved downwardly. This relation is clearly shown in Fig. 1. In order to allow for this difference in operation or movement, I arrange the finger 90 on a pin 90ª. The pin 90ª is secured to the arm 91, and provided with the spring 90ᵇ to hold the finger 90 in position against the arm 91. As the finger 90 engages the projection 89, it swings downwardly from the arm 91 to permit of the movement of the finger 85 on its axis.

The arm 92 is provided with the severing knife 111 which operates at the time hereinafter described and illustrated in Fig. 20. A gripper formed of the gripping fingers 2 and 2ª is mounted on an arm 113 on the swinging bracket 112. The swinging bracket 112 is mounted on the shaft 34. A bearing 114 is arranged at the top of the arm 113 and the shaft 115 is journaled in this bearing, and the head 116 carrying the fingers is fixed on this shaft. The spring finger 2ª is secured by means of the screws 117 on the side of the bearing 114. A ratchet wheel 118 is fixed on the outer end of the shaft 115. A rock lever 119 formed of two plates secured together by the pin 120 is journaled on the shaft 115, the plates extending each side of the ratchet wheel 118. A pawl 121 is carried by the rock arm 119 in position to engage the ratchet wheel 118. The ratchet wheel 118 is provided with four teeth to correspond with the fingers 2 and the ratchet is moved one quarter of a revolution with each operation, so as to move the bottom finger 2 around, carrying the twine with it, so as to bind the twine between the finger 2 and the spring finger 2ª. A link 122 extends through the rock arm 119, and a lever 123. The lever 123 is pivoted on the bracket 112 by means of a screw 123ª. A throated plate 124 is secured to the lever 123, and straddles the lip 125 on the rock lever 126. The lip 125 is in a form of a segment with the axis of the shaft 34 as a center, so that as the bracket 112 swings the throated plate 124 remains in engagement with the lip 125. The lever 126 is pivoted at one side by means of the screw 127ª on the bracket 127, extending from the frame. The opposite side of the lever is carried by a pin 129 extending from the frame.

A link 130 is pivotally secured by means of a screw 131 on the lever 126 and by screw 132 on the crank 133. The crank 133 is fixed on the shaft 98, and therefore, the lever 126 is rocked at the time the arms 91 and 92 are actuated. This timing in relation to the cranks is such, however, that the movement of the rocking lever 126 is more rapid and is completed sooner than the movement of the arms 91–92, so that the lever 123, rock arm 119 and shaft 115 are actuated to bring the bottom grip finger into position to grip the twine on the spring finger 2ª before the severing of the twine by the severing device. As the knot is formed it is desirable to swing the twine grip 2 and 2ª toward the tying fingers to supply the necessary twine for the knot. It is for this purpose that the bracket 112 is pivotally mounted, and the operating mechanism for the ratchet 118 is such as to permit of this swinging, without interfering with the proper operation of the ratchet wheel. A lever 134 is pivotally mounted by means of the screw 135 on the bracket 136. It has a cam surface 137 adapted to be operated upon by the cam 138 fixed on the shaft 17. A link 139 is pivotally secured to the lever 134 by screw 140 and to bracket 112 by screw 141. The cam 138 is so timed as to swing the lever 134 and bracket 112 a proper distance toward the knotter and at the proper time to supply the twine for tying the knot. A spring 142 maintains the lever 134 in position against the cam. This spring extends from the lever to a part of the frame.

A shield or guide 143 against which the bundle, to be bound, is placed, is arranged to carry the bundle in a vertical position, and the axis of the bundle is approximately in line with the axis of the shaft 34. This shield or guide is removed in Fig. 1 and practically removed in Figs. 2 and 4. The hook 3 is carried by this guide, and this guide or shield protects the knotting device, and also practically places the bundle.

What we claim as new is:

1. In a bundle binding machine, the combination of a knot tying device; a twine carrier; and means for actuating the twine carrier to make a plurality of wraps of twine and to bring the twine into position on the last wrap to be operated upon by the tying device.

2. In a bundle binding machine the combination of a knot tying device; a twine carrier journaled with an axis extending through the wrap formed by the carrier; and means for actuating the twine carrier to make a plurality of wraps of the twine and to bring the twine into position on the last wrap to be operated upon by the tying device.

3. In a bundle binding machine the combination of a knot tying device; a twine carrier comprising an off set arm journaled with an axis extending through the wrap formed by the carrier; and means for actuating the twine carrier to make a plurality of wraps of twine and to bring the twine into position on the last wrap to be operated upon by the tying device.

4. In a bundle binding machine the combination of a knot tying device; a twine carrier journaled with its axis extending through the wrap formed by the carrier, and comprising an arm having an off set, and a part extending parallel to the axis to form the wrap; and means for actuating the carrier to make a plurality of wraps of twine, and to bring the twine into position to be operated upon by the tying device.

5. In a bundle binding machine, the combination of a knot tying device; a twine carrier; means for actuating the carrier to make a plurality of wraps, lapping the twine past the knot tying device on the last wrap; and mechanism for returning the carrier past the tying device to reset the twine.

6. In a bundle binding machine, the combination of a knot tying device; a twine carrier journaled with an axis extending through the wrap formed by the carrier; means for actuating the carrier to make a double wrap of twine and to lap the twine past the knot tying device on the last wrap; and mechanism for returning the carrier past the tying device to reset the twine.

7. In a bundle binding machine the combination of a knot tying device; a twine carrier journaled with an axis extending through the wrap formed by the carrier and comprising an off set arm having a part extending parallel to the axis of the carrier; means for actuating the carrier to make a double wrap of twine and to lap the twine past the knot tying device on the last wrap; and mechanism for returning the carrier past the tying device to reset the twine.

8. In a bundle binding machine, the combination of a knot tying device, a twine carrier; means for actuating the carrier to make a plurality of wraps, lapping the twine past the knot tying device on the last wrap; mechanism for returning the carrier past the tying device to reset the twine; and a hook for catching the twine on the return movement, and for holding the twine in proper relation to the tying device.

9. In a bundle binding machine, the combination of a knot tying device; a twine carrier; means for actuating the twine carrier to make a plurality of wraps of twine and to carry the twine in proper relation with the tying device for forming the knot, and a twine grip for catching and holding the twine at the completion of the last wrap.

10. In a bundle binding machine, the combination of a knot tying device; a twine carrier; means for actuating the twine carrier to make a plurality of wraps and to carry the twine into position to be acted upon by the knot tying device; and a cutter for severing the twine outside of the knot.

11. In a bundle binding machine, the combination of a knot tying device; a twine carrier; means for actuating the twine carrier to make a plurality of wraps of twine and to carry the twine in proper relation with the tying device for forming the knot, and the twine grip for catching and holding the twine at the completion of the last wrap; and a cutter for severing the twine between the grip and the knot tying device.

12. In a bundle binding machine, the combination of a knot tying device; a twine carrier; means for actuating the twine carrier to form a plurality of wraps carrying the twine into the path of the tying device with each wrap; and mechanism for preventing the catching of the twine by the tying device on the first wrap.

13. In a bundle binding machine, the combination of a knot tying device; a twine carrier; means for actuating the twine carrier to form a plurality of wraps; mechanism for preventing the catching of the twine by the tying device on the first wrap; and means for throwing the mechanism out of action on the last wrap of the twine.

14. In a bundle binding machine, the combination of a tying device; a twine carrier; means for actuating the twine carrier to form a plurality of wraps carrying the twine into the path of the tying device with each wrap; a gripping mechanism for catching and holding the twine; and mechanism for preventing the catching of the twine by the tying device on the first wrap.

15. In a bundle binding machine, the combination of a tying device; a twine carrier; means for actuating the twine carrier to form a plurality of wraps; a gripping mechanism for catching and holding the twine; mechanism for preventing the catching of the twine by the tying device on the first wrap; and means for throwing the mechanism out of action on the last wrap of the twine.

16. In a bundle binding machine, the combination of a knot tying device; a twine carrier; a twine grip for catching and holding the twine; means for actuating the twine carrier to make a plurality of wraps of the twine, and to bring the twine into position to be tied and to be engaged by the grip; and means for moving the grip to clamp the twine as the knot is tied.

17. In a bundle binding machine, the combination of a knot tying device, a bundle guide in proper relation to the knot tying device; a twine carrier adapted to encircle the bundle on the bundle guide; and means for actuating the twine carrier to make a plurality of wraps of twine, and to bring the twine into position on the last wrap to be operated upon by the tying device.

18. In a bundle binding machine, the combination of a bundle guide; a knot tying device; a twine carrier journaled with an axis extending through the wrap made by the carrier and adapted to encircle the bundle placed on the guide; and means for actuating the carrier to encircle the bundle and to carry the twine into proper relation to the tying device.

19. In a bundle binding machine the combination of a guide adapted to place a bundle in a vertical position; a knot tying device; a twine carrier journaled with an axis extending in a vertical direction through the loop made by the carrier, and adapted to encircle the bundle placed on the guide; and means for actuating the carrier to make a plurality of wraps and to carry the twine into position to be acted upon by the knot tying device.

20. In a bundle binding machine, the combination of a knot tying device; a rotative carrier arranged to make a plurality of wraps and to carry the twine into proper relation with the tying device; and a series of mutilated gears for actuating the carrier to make a plurality of wraps and then to return past the tying device.

21. In a bundle binding machine the combination of a knot tying device; a rotating twine carrier adapted to encircle the bundle, and to carry the twine into proper relation with the tying device; a mutilated driving gear; a gear on the carrier; an intermediate mutilated gear between the carrier gear and the driving gear; and an auxiliary mutilated gear meshing the intermediate gear and a gear on the mutilated driving gear, the mutilated driving gear being provided with driving parts and dwell portions to drive the carrier through the intermediate gear in one direction and to return the carrier by driving the carrier from the driving gear through the auxiliary and intermediate gears.

22. In a bundle binding machine the combination of a knot tying device; a rotating twine carrier arranged to make a plurality of wraps and then a return movement; a gear on the carrier; a mutilated driving gear having a forward driving member and a reverse driving member on a different plane; an intermediate gear between the carrier gear and the driving gear operating upon the forward driving member of the driving gear; an auxiliary gear meshing the intermediate gear and adapted to be driven by the reverse member of the driving gear; a dwell surface on the driving gear, auxiliary gear and intermediate gear to drive the carrier forward a plurality of wraps, then dwell, then return.

23. In a bundle binding machine, the combination of a knot tying device; a twine carrier; means for actuating the twine carrier to make a plurality of wraps of twine and to bring the twine into position on the last wrap to be operated upon by the tying device; and a tension device for the twine arranged on the carrier.

24. In a bundle binding machine, the combination of a knot tying device; a twine carrier; means for actuating the twine carrier to make a plurality of wraps of twine; a series of mutilated gears for driving the carrier; a ratchet device for driving the mutilated gears; a gear driving the ratchet device; a gear segment driving gear driving the ratchet device; and a foot lever for actuating with a single movement the gear segment.

25. In a bundle binding machine, the combination of a tying device, comprising looping fingers; a twine carrier; means for actuating the twine carrier to form a plurality of wraps; a bail; and means for throwing the bail into the path of the twine on the first wrap to prevent the engagement of the twine with the looping fingers, and to throw the bail out of the path of the twine on the last wrap.

26. In a bundle binding machine the combination of a tying device, comprising looping fingers; a twine carrier; means for actuating the twine carrier to form a plurality of wraps; a bail; a bell crank on which the bail is mounted; and means operating on the bell crank to throw the bail into the path of the twine on the first wrap to prevent the engagement of the twine with the looping fingers, and to throw the bail out of the path of the twine on the last wrap.

27. In a bundle binding machine, the combination of a knot tying device, comprising looping fingers; a twine carrier; means for actuating the twine carrier to form a plurality of wraps; a bail; and a cam for actuating the bail to throw the bail into the path of the twine on the first wrap to prevent the engagement of the twine with the looping fingers, and to throw the bail out of the path of the twine on the last wrap.

28. In a bundle binding machine, the combination of a knot tying device, comprising looping fingers; a twine carrier; means for actuating the twine carrier to form a plurality of wraps; a bail; a bell crank on which the bail is mounted; a lever operating upon the bell crank; and a cam operating on the lever to throw the bail into the path of the twine on the first wrap to prevent the engagement of the twine with the looping fingers, and to throw the bail out of the path of the twine on the last wrap.

29. In a bundle binding machine, the combination of a tying device, comprising looping fingers; a twine carrier; means for actuating the twine carrier to form a plurality of wraps; a twine grip for holding the end of the twine; a bail; means for throwing the bail into the path of the twine to prevent its engagement with the grip on the first wrap of the twine and out of the path of the twine on the last wrap.

30. In a bundle binding machine, the combination of a knot tying device; a carrier; a twine grip; means for actuating the carrier to make a plurality of wraps, the twine grip being in the path of the twine as carried by the carrier; and means for preventing the engagement of the twine with the grip or tying device on the first wrap of the twine.

31. In a bundle binding machine, the combination of a knot tying device, comprising looping fingers; a twine carrier; means for actuating the twine carrier to form a plurality of loops; a twine grip for holding the end of the twine; a bail; means for throwing the bail into the path of the twine on the first wrap to prevent the engagement of the twine with the looping fingers and the twine grip, and out of the path of the twine on the last wrap to permit of the engagement of the twine with the tying fingers and the twine grip.

32. In a bundle binding machine, the combination of a knot tying device, comprising looping fingers; a twine grip for holding the end of the twine; a twine carrier adapted to carry the twine into position to be acted upon by the fingers and the grip; means for actuating the carrier to make a plurality of wraps; a bail adapted to be thrown into the path of the twine to prevent the engagement of the twine with the fingers and grip on the first wrap; a bell crank on which the grip is mounted; a lever actuating the bell crank; and a cam for operating the lever to throw the bail into the path of the twine on the first wrap and out of the path of the twine on the last wrap.

33. In a bundle binding machine the combination of a rotating knot tying device; a twine carrier; means for actuating the twine carrier to make a plurality of wraps, the knot tying device being in the normal path of the twine as carried by the carrier; and mechanism for preventing the catching of the twine by the tying device on the first wrap.

34. In a bundle binding machine, the combination of a rotating knot tying device, comprising loop forming fingers normally extending downwardly; a twine carrier adapted to carry the twine into the proper relation with the fingers; means for actuating the carrier to form a plurality of wraps; a bail and means for throwing the bail into the path of the twine for preventing the engagement of the twine on the first wrap, and out of the path of the twine on the last wrap.

35. In a bundle binding machine the combination of a knot tying device; a rotating twine grip for catching and holding the end of the twine, comprising a series of fingers one of which extends below the axis of the grip, and into the path of the twine; a twine carrier adapted to make a plurality of wraps; and means for actuating the carrier and devices thrown into the path of the twine for preventing its engagement with the downwardly extending grip finger or the twine fingers on the first wrap and thrown out of the path of the twine on the last wrap.

36. In a bundle binding machine the combination of a knot tying device; a rotating twine grip, comprising a series of fingers; a spring finger co-acting with one of the fingers as the fingers are turned, one of the fingers being in the path of the twine; a twine carrier; means for actuating the twine carrier to make a plurality of wraps, and to carry the twine into the path of the tying device; and the twine grip; means thrown into the path of the twine for preventing its engagement with the downwardly extending finger of the twine grip on the first wrap, and out of the path of the twine on the last wrap to permit of the engagement of the twine by the fingers on the second wrap; and means for rotating the grip fingers to bring the finger with the twine into clamping position.

37. In a bundle binding machine the combination of a tying device, comprising looping fingers; a hook adjacent to the fingers; a carrier adapted to make two wraps of the twine, and to carry the twine around the fingers, and over the hook; and devices thrown into the path of the twine for preventing the engagement of the twine with the hook on the first wrap and thrown out of the path of the twine on the last wrap.

38. In a bundle binding machine, the combination of a tying device, comprising downwardly extending looping fingers; a hook adjacent to the fingers; a carrier adapted to make two wraps of the twine, and to carry the twine around the fingers, and over the hook; and devices thrown into the path of the twine for preventing the engagement of the twine with the hook on the first wrap and thrown out of the path of the twine on the last wrap.

39. In a bundle binding machine, the combination of a knot tying device, comprising downwardly extending fingers; a hook adjacent to the fingers; a grip adapted to hold the end of the twine; a twine carrier adapted to make a plurality of wraps, and to carry the twine into the path of the tying device, the hook and the grip; means for actuating the carrier; and mechanism thrown into the path of the twine for preventing the engagement of the twine with the tying device, hook and grip on the first wrap, and thrown out of the path of the twine to permit of the engagement of the twine by the tying device, hook and grip on the last wrap.

40. In a bundle binding machine, the combination of a tying device; a twine grip for holding the end of the twine; a twine carrier adapted to make a plurality of wraps; means for actuating the carrier; means for actuating the tying device; means for actuating the twine grip; a severing device for severing the twine between the grip and the tying device; and a foot lever for actuating with a single movement of the lever the said means, said tying device, said severing device, and said grip.

41. In a bundle binding machine, the combination of a tying device; a twine carrier for making the wrap; a severing device for severing the twine outside the knot; and a mutilated gear for actuating the severing device.

42. In a bundle binding machine, the combination of a tying device; a twine grip; a twine carrier adapted to make a plurality of wraps; a severing device for severing the twine between the tying device and the grip; an arm carrying the severing device; a crank actuating the arm; and a mutilated gear actuating the crank.

43. In a bundle binding machine, the combination of a tying device; a twine carrier for making the wrap; a severing device for severing the twine outside the knot; a mutilated gear for actuating the severing device; and a foot lever for actuating the mutilated gear.

44. In a bundle binding machine, the combination of a tying device; a twine grip adapted to engage and clamp the twine; a twine carrier adapted to form the wrap, and to carry the twine into position to be acted upon by the tying device, and grip; a severing device for severing the twine between the grip and the tying device; and means for actuating the grip for tying the twine prior to the severing of the twine.

45. In a bundle binding machine the combination of a tying device; a grip for holding the end of the twine, and comprising a series of fingers; a clamping device adapted to be engaged by one of the fingers as the fingers are rotated; a twine carrier for making the wrap and carrying the twine into position to be acted upon by the tying device, and over one of the grip fingers, a severing device acting upon the twine between the tying device and the grip, and means bringing the finger with the engaged twine into position prior to the severing of the twine.

46. In a bundle binding machine, the combination of a tying device; a carrier for making the wrap, and for carrying the twine into position to be acted upon by the device; a push off device for pushing the knot off the tying device; a severing device; and a single mechanism for actuating the severing device and the push off.

47. In a bundle binding machine the combination of a tying device; a twine carrier; and a twine grip for holding the end of the twine, comprising rotary fingers and a clamping member operating with one of the fingers for clamping the twine as the finger is rotated.

48. In a bundle binding machine the combination of a tying device; a twine carrier; a twine grip for holding the end of the twine, comprising rotary fingers; a clamping piece acting with one of the fingers and between which and one of the fingers the end of the twine is clamped with one of the other fingers in the path of the twine; and means for rotating the fingers for carrying the twine, and disengaging the finger over the clamping piece to release the end of the twine, and clamp the twine engaged.

49. In a bundle binding machine the combination of a tying device; a twine carrier; a twine grip for holding the end of the twine, comprising rotary fingers; a clamping piece acting with one of the fingers and between which and one of the fingers the end of the twine is clamped with one of the other fingers in the path of the twine; means for rotating the fingers for carrying the twine, and disengaging the finger over the clamping piece to release the end of the twine, and clamp the twine engaged; and a severing device severing the twine after the clamping of the engaged twine.

50. In a bundle binding machine, the combination of a tying device; a twine carrier; a twine grip for holding the end of the twine, comprising rotary fingers; a clamping member operating with one of the fingers for clamping the twine as the finger is rotated; and a ratchet device actuating the grip to advance one finger on the clamping piece with each cycle of the machine.

51. In a bundle binding machine, the combination of a tying device; a twine carrier; a twine grip for holding the end of the twine, comprising rotary fingers; a clamping member operating with one of the fingers for clamping the twine as the finger is rotated; and a foot lever actuating said tying device, carrier and grip.

52. In a bundle binding machine, the combination of a tying device; a twine carrier; a twine grip for holding the end of the twine, comprising rotary fingers; a clamping member operating with one of the fingers for clamping the twine as the finger is rotated; a ratchet device actuating the grip to advance one finger on the clamping piece with each cycle of the machine; and a crank for actuating the ratchet mechanism.

53. In a bundle binding machine, the combination of a tying device; a twine carrier; a twine grip for holding the end of the twine, comprising rotary fingers; a clamping member operating with one of the fingers for clamping the twine as the finger is rotated; a ratchet device actuating the grip to advance one finger on the clamping piece with each cycle of the machine; a crank for actuating the ratchet mechanism; and a mutilated gear for actuating the crank.

54. In a bundle binding machine, the combination of a tying device; a twine carrier; a twine grip for holding the end of the twine, comprising rotary fingers; a clamping member operating with one of the fingers for clamping the twine as the finger is rotated; a ratchet device actuating the grip to advance one finger on the clamping piece with each cycle of the machine; a crank for actuating the ratchet mechanism; a mutilated gear for actuating the crank; and a foot lever for actuating the mutilated gear.

55. In a bundle binding machine the combination of a tying device; a twine carrier; a twine grip for holding the end of the twine; comprising rotary fingers; a clamping member operating with one of the fingers for clamping the twine as the finger is rotated; a ratchet device for actuating the twine grip; a mutilated gear for actuating the ratchet device; and a foot lever for actuating the mutilated gear.

56. In a bundle binding machine the combination of a tying device; a twine grip for holding the end of the twine; a yielding frame holding the grip; and means for actuating the tying device.

57. In a bundle binding machine the combination of a tying device; a twine grip for holding the end of the twine; a yielding frame holding the grip; means for actuating the tying device; and means for moving the twine grip as the knot is formed to supply the twine for the knot.

58. In a bundle binding machine the combination of a tying device; a twine grip for holding the end of the twine; a swinging support for the twine grip; and means for swinging the support as the knot is formed.

59. In a bundle binding machine the combination of a rotary twine grip for holding the end of the twine; a movable support for the grip; means for actuating the grip to supply the twine for the knot; and means for rotating the grip.

60. In a bundle binding machine, the combination of a tying device; a grip for the end of the twine; a movable support for the grip; means for moving the grip as the knot is formed; and means for actuating the grip to release the twine and reëngage the same for a new wrap.

61. In a bundle binding machine, the combination of a tying device; a bundle guide adapted to hold the bundle in a vertical position; a carrier for making the wrap around the bundle so held; a grip; devices for tying a knot for holding the end of the twine; a movable support for the grip; and means for moving the grip to yield as knot is formed for tying the knot.

62. In a bundle binding machine, the combination of a tying device; a grip for holding the end of the twine; a movable support for the grip; means for actuating the grip and movable support; and a foot lever for actuating the said means and tying device.

63. In a bundle binding machine, the combination of a tying device; a grip for holding the end of the twine; a swinging support for the grip; means for actuating the grip comprising a lever; a segmental lever engaging the said actuating lever; and means for actuating said segmental lever to actuate the grip.

64. In a bundle binding machine the combination of a tying device; a grip for holding the end of the twine; a swinging support for the grip; means for actuating the grip, comprising a lever; a segmental lever engaging the said actuating lever; means for actuating said segmental lever to actuate the grip; and means for swinging the support as the grip is actuated.

65. In a bundle binding machine the combination of a tying device; a twine grip for holding the end of the twine; a lever for actuating the twine grip; a crank for actuating the lever; and means for actuating the crank.

66. In a bundle binding machine, the combination of a tying device; a twine grip for holding the end of the twine; a lever for actuating the twine grip; a crank for actuating the lever; and a mutilated gear for actuating the crank.

67. In a bundle binding machine, the combination of a tying device; a rotary twine grip for the end of the twine; a ratchet device for actuating the grip; a swinging support for the grip; a lever for actuating the grip carried by the swinging support; a segmental lever engaging the said lever; and means for actuating the segmental lever to actuate the grip.

68. In a bundle binding machine, the combination of a tying device; a rotary twine grip for the end of the twine; a ratchet device for actuating the grip; a swinging support for the grip; a lever for actuating the grip carried by the swinging support; a segmental lever engaging the said lever; and means for actuating the segmental lever to actuate the grip, comprising a crank and mutilated gear.

69. In a bundle binding machine, the combination of a tying device; a rotary twine grip for the end of the twine; a ratchet device for actuating the grip; a swinging support for the grip; a lever for actuating the grip carried by the swinging support, a segmental lever engaging the said lever; and means for actuating the segmental lever to actuate the grip, comprising a crank, mutilated gear and a foot lever.

70. In a bundle binding machine the combination of a tying device; a rotary twine grip for the end of the twine; a ratchet device for actuating the grip; a swinging support for the grip; a lever for actuating the grip carried by the swinging support; a segmental lever engaging the said lever; means for actuating the said lever to actuate the grip; and means for swinging said support to move the twine grip relatively to the tying device to supply the twine for the knot.

71. In a bundle binding machine the combination of a tying device; a bundle guide for placing a bundle in a vertical position; a twine carrier, adapted to form a wrap on the bundle, so placed; a hollow shaft on which the carrier is mounted; and means for leading the twine through the hollow shaft onto the carrier.

72. In a bundle binding machine, the combination of a tying device; a bundle guide for placing a bundle in a vertical position; a twine carrier, adapted to form a wrap on the bundle, so placed; a hollow shaft on which the carrier is mounted; a twine box on the bottom of the shaft and means for leading the twine through the shaft onto the carrier.

73. In a bundle tying machine, the combination of a knot tying device; a twine carrier journaled with its axis extending through the wrap formed by the carrier, and comprising an arm having an offset, and a part extending parallel to the axis to form the wrap; means for actuating the carrier to make a plurality of wraps, and to bring the twine into position to be operated upon by the tying device; and a foot lever for actuating the tying device and said means.

74. In a bundle binding machine, the combination of a knot tying device; a twine carrier; means for actuating the twine carrier to make a plurality of wraps of twine and to carry the twine in proper relation with the tying device for forming the knot; a twine grip for catching and holding the twine at the completion of the last wrap; and a foot lever for actuating the tying device, gripping mechanism and means.

In testimony whereof, we have hereunto set our hands in the presence of two subscribing witnesses.

RICHARD M. INGLIS.
FRANK E. WOOD.

Witnesses:
C. D. HIGBY,
M. M. BEIGLE.